United States Patent [19]
Douglass

[11] 3,851,855
[45] Dec. 3, 1974

[54] THRUST BALL BEARING CONSTRUCTION FOR TRAILER JACK

[75] Inventor: Burdette L. Douglass, Rockford, Ill.

[73] Assignee: Atwood Vacuum Machine Company, Rockford, Ill.

[22] Filed: Oct. 30, 1973

[21] Appl. No.: 411,003

[52] U.S. Cl. .............................. 254/86 R, 308/230
[51] Int. Cl. ......................... B66f 3/10, F16c 17/04
[58] Field of Search........... 254/86 R; 308/230, 233, 308/235; 29/148.4 R, 148.4 B, 148.4 C

[56] References Cited
UNITED STATES PATENTS

| | | | |
|---|---|---|---|
| 1,296,650 | 3/1919 | Graham | 308/235 |
| 2,638,315 | 5/1953 | Wagner | 254/86 R |
| 3,311,433 | 3/1967 | Graham | 308/230 |

*Primary Examiner*—Al Lawrence Smith
*Assistant Examiner*—Robert C. Watson
*Attorney, Agent, or Firm*—Wolfe, Hubbard, Leydig, Voit & Osann, Ltd.

[57] ABSTRACT

A thin hard upper washer of spring-steel hardness is deformable enough to permit its being brinnelled by rolling contact with a set of bearing balls, so that serviceable raceways are thereby defined in the soft bearing cap welded to the upper end of the jack.

The jack bearing, therefore, is self-aligning. Thus, if in assembling of the jack nut on the inner ram, this nut does not happen to be mounted accurately in line with the ram but at the outset has some angularity of its pitch diameter with the ram's O.D., this bearing has the capability of taking up correct alignment in the initial jack on any given installation by shifting laterally in one direction or the other, and finally locating itself so that when the jack is operated the screw turns with a minimum amount of side-thrust on the nut. With this improved construction, the right raceways are not produced initially in the jack but once they are the correct alignment that is created minimizes on-side loading of the nut, which I found increases the life of the zinc nut way beyond anything anticipated previously.

3 Claims, 2 Drawing Figures

PATENTED DEC 3 1974

3,851,855

THRUST BALL BEARING CONSTRUCTION FOR TRAILER JACK

A thin hard upper thrust washer of spring-steel hardness is deformable enough to allow brinnelling by rolling contact with a set of bearing balls. This brinnelling causes shaping of the soft top plate that is welded to the upper end of the jack. This thin hard upper thrust washer cooperates with a soft lower thrust washer on which the set of bearing balls run, the upper washer being more resilient than the lower washer. There is also a central lubricant retainer sleeve which holds lubricant to lubricate the balls throughout the brinnelling phase. The resulting assembly is a self-aligning bearing which adds greatly to the overall service life of the assembly while cutting the cost to a bare minimum.

Figure 1:
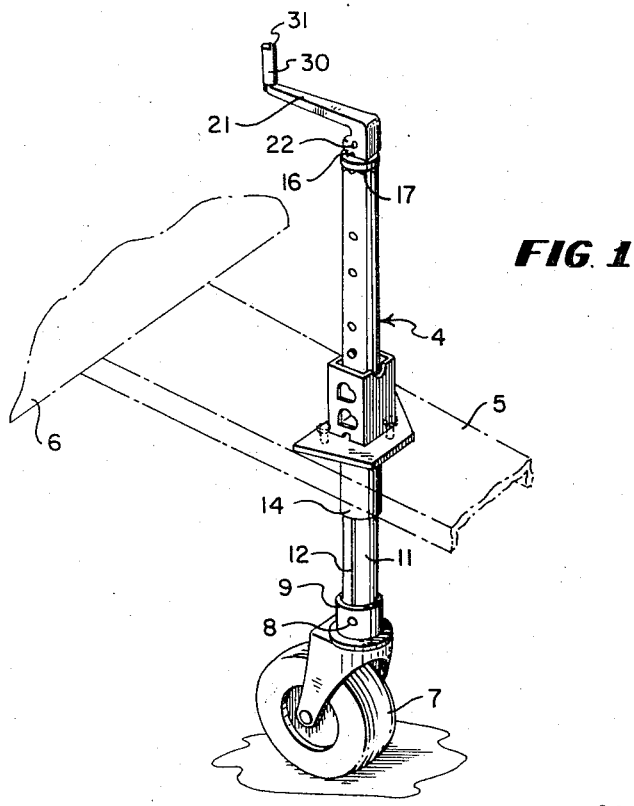
Figure 2:
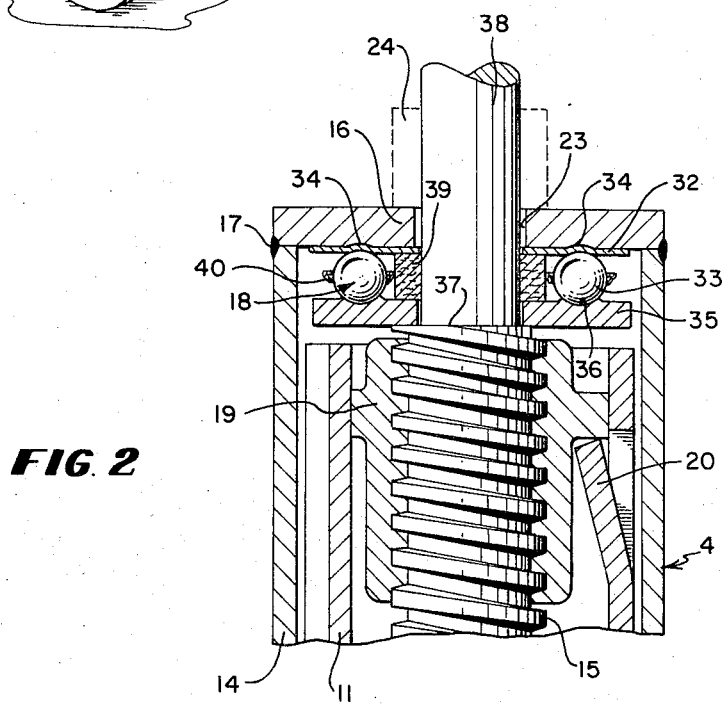

The invention is illustrated in the accompanying drawing, in which:

FIG. 1 is a perspective view of my jack assembly incorporating the improved bearing of my invention, indicating in phantom a portion of the trailer tongue and also a portion of the trailer body, the jack being shown in extended position with the crank also in operative position for the finer screw adjustment of the jack, as when lifting the coupler socket (not shown) off the coupler ball (not shown) on the rear end of a towing vehicle, and FIG. 2 is a section in a vertical plane through the upper end of the jack showing the improved ball bearing construction.

The same reference numerals are applied to corresponding parts in these two views.

Referring to the drawing, the jack assembly of my invention designated generally by the reference numeral 4 is shown mounted on the tongue 5 of the trailer, between the body 6 and the socket of a ball and socket coupler (not shown), so that when the trailer reaches the spot where it is to be uncoupled from the towing vehicle, the jack 4 is adapted to be extended downwardly to assume the load. A caster wheel 7 may be detachably coupled to the jack by engagement of a radially inward projection 8 in the socket 9 in a two-way generally T-shaped bayonet slot provided at the lower end of the jack's lift tube 11, entry of the projection 8 in the T-slot being conveniently made through the lower end of a vertically extending groove 12 formed in the tube and cooperating with a radially inwardly projecting key portion indented in the tubular body of the jack to hold the tube 11 against turning relative to tube 14. The lift tube 11 telescopes in tube 14, as clearly appears in FIGS. 1 and 2.

A jack-screw 15 is centrally located with respect to tubes 11 and 14, as clearly shown in FIG. 2, and extends downwardly therein from the top plate 16, that is suitably welded as at 17 to the upper end of the tube 14. The screw 15 has its upper end swiveled with respect to the plate 16 by means of a bearing 18, and threads in a zinc nut 19 suitably supported in the upper end of tube 11 on an indented portion 20 and suitably held against turning with respect to the tube 11, whereby to force the lift tube 11 downwardly with respect to the tube 14 when the screw 15 is turned in a clockwise direction. The screw is turnable by means of a crank 21 of channel section sheet-metal construction, which is pivotally connected, with a cross-pin 22, with the slightly reduced upper end portion of the screw, which extends through a center hole 23 in plate 16, and has a sleeve 24 telescoped thereon and having bearing contact at its lower end on top of the plate 16, holding the screw 15 against downward displacement with respect thereto.

The crank 21 has its handle 30 turning freely on a headed pin 31, which has a reduced upset end portion entered through a hole in the outer end of the crank.

The ball bearing 18 with which my invention is mainly concerned, comprises, in addition to the top plate 16 of soft steel welded, as at 17, to the upper end of the tube 14, an upper thrust washer 32 of hard thin steel, adapted to be brinnelled by rolling contact with the bearing balls 33, as indicated at 34 for about 50 percent of the self-aligning feature in this jack. The other half of the self-aligning feature is involved in the brinnelling similarly of the soft lower thrust washer 35, as shown at 36, this washer 35 resting on the annular shoulder 37 defined at the upper end of the jack-screw 15. The washer 32, it will be noticed, has a close fit on the shank 38 of the screw 15 and thereby serves to seal the bearing 18 against downward ingress of dirt while still leaving the shank 38 ample operating clearance relative to the hole 23 and holding the felt washer 39, that is pressed around the shank 38 and stores a supply of lubricant for lubrication of the bearing balls 33. The bearing balls 33 are held together by the retainer 40.

If, in assembly of the nut 19 on the inner ram, the nut does not happen to be in line with the screw and has some angularity of its pitch diameter relative to the screw, this new bearing structure has the capability of allowing for misalignment in its initial operation of the jack on any given installation by shifting the screw laterally in one direction or the other and finally locating itself in such a way when the jack is operated that the screw turns with the minimum amount of side-thrust on the nut. The net result is that I find that I have increased the life of the zinc nut 19 many times over the results obtainable with conventional designs not including the improvements herein disclosed.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. In a jack ball-bearing construction, an upright housing having an upper wall provided with a center opening through which a reduced jack screw shank projects upwardly from the housing for manual rotation, a nut threaded on and movable along said jack screw to convert rotation of the screw into axial movement for raising and lowering a load, thrust bearing improvements comprising upper and lower metal washers engageable with the downwardly facing side of the upper wall of said housing and the upwardly facing end of said screw, respectively, a circle of bearing balls extending around said shank and captivated between said washers, said upper washer being thinner than the lower washer, having a hardness greater than the hardness of the lower washer, and being more resilient than the lower washer, said washers being brinnelled by load contact with said circle of bearing balls with said brinnelling forming races for said balls so as to make the bearing self-aligning.

2. A jack ball-bearing construction as set forth in claim 1 including a dirt excluding and lubricant retaining washer surrounding the jack screw shank inside the circle of bearing balls.

3. A jack ball-bearing construction as set forth in claim 1 including a ball retainer maintaining the array of bearing balls in a circle around the screw shank, and a dirt excluding and lubricant retaining washer surrounding the jack screw shank inside the circle of bearing balls.

* * * * *